(12) United States Patent
Zhang et al.

(10) Patent No.: US 10,848,709 B2
(45) Date of Patent: *Nov. 24, 2020

(54) ARTIFICIAL INTELLIGENCE BASED IMAGE DATA PROCESSING METHOD AND IMAGE PROCESSING DEVICE

(71) Applicant: EagleSens Systems Corporation, Grand Cayman (KY)

(72) Inventors: Guangbin Zhang, Cupertino, CA (US); Weihua Xiong, Cupertino, CA (US)

(73) Assignee: EAGLESENS SYSTEMS CORPORATION, George Town (KY)

( * ) Notice: Subject to any disclaimer, the term of this patent is extended or adjusted under 35 U.S.C. 154(b) by 30 days.

This patent is subject to a terminal disclaimer.

(21) Appl. No.: 16/133,560

(22) Filed: Sep. 17, 2018

(65) Prior Publication Data
US 2019/0110020 A1 Apr. 11, 2019

Related U.S. Application Data

(60) Provisional application No. 62/569,618, filed on Oct. 9, 2017.

(51) Int. Cl.
G06K 9/32 (2006.01)
H04N 7/01 (2006.01)
(Continued)

(52) U.S. Cl.
CPC ......... H04N 7/0117 (2013.01); G06K 9/3233 (2013.01); G06K 9/3258 (2013.01);
(Continued)

(58) Field of Classification Search
CPC .. H04N 7/0117; H04N 19/85; H04N 5/23232; H04N 7/12; H04N 19/86; H04N 5/262; H04N 19/167; H04N 5/23229; G06T 2207/20016; G06T 2207/20221; G06T 2207/30252; G06T 2207/30201; G06T 5/008; G06T 5/007; G06T 5/50; G06K 2209/15; G06K 9/00664; G06K 9/00818;
(Continued)

(56) References Cited

U.S. PATENT DOCUMENTS 10,389,784 B2 * 8/2019 Denoual ................ H04N 5/76
2013/0121588 A1 * 5/2013 Noguchi ............... H04N 19/17
382/195

(Continued)

Primary Examiner — Dhaval V Patel
(74) Attorney, Agent, or Firm — Sheppard Mullin Richter & Hampton LLP

(57) ABSTRACT

An image data processing method includes receiving, from an image sensor, frame image data of a frame at a first resolution, reducing a resolution of the frame image data to a second resolution, performing image recognition on the frame image data to determine one or more regions of interest (ROI) and a priority level of each of the one or more ROIs, and extracting portions of the frame image data corresponding to the one or more ROIs. The method further includes modifying a resolution of the portions of the frame image data corresponding to the one or more ROIs based on the priority level of the ROIs, and combining the resolution-modified portions of the frame image data corresponding to the one or more ROIs with the frame image data at the second resolution to generate output frame image data.

18 Claims, 8 Drawing Sheets

(51) Int. Cl.
- *G06T 5/00* (2006.01)
- *G06K 9/46* (2006.01)
- *G06T 5/50* (2006.01)
- *H04N 5/232* (2006.01)
- *H04N 7/12* (2006.01)
- *H04N 19/85* (2014.01)
- *H04N 19/167* (2014.01)
- G06K 9/00 (2006.01)
- H04N 19/86 (2014.01)

(52) U.S. Cl.
CPC ............... *G06K 9/46* (2013.01); *G06T 5/007* (2013.01); *G06T 5/008* (2013.01); *G06T 5/50* (2013.01); *H04N 5/23229* (2013.01); *H04N 5/23232* (2013.01); *H04N 7/12* (2013.01); *H04N 19/167* (2014.11); *H04N 19/85* (2014.11); *G06K 9/00664* (2013.01); *G06K 9/00818* (2013.01); *G06K 2209/15* (2013.01); *G06T 2207/20016* (2013.01); *G06T 2207/20221* (2013.01); *G06T 2207/30201* (2013.01); *G06T 2207/30252* (2013.01); *H04N 19/86* (2014.11)

(58) Field of Classification Search
CPC ............. G06K 9/00892; G06K 9/3258; G06K 9/3233; G06K 9/46
See application file for complete search history.

(56) References Cited

U.S. PATENT DOCUMENTS

| | | | |
|---|---|---|---|
| 2015/0237351 A1* | 8/2015 | Lee | H04N 19/70 375/240.26 |
| 2018/0063372 A1* | 3/2018 | Rutschman | G06F 3/011 |
| 2019/0191128 A1* | 6/2019 | Yamagaki | H04N 7/183 |

* cited by examiner

400

| Traditional | AI extracted | Traditional | AI extracted |
|---|---|---|---|
|  |  |  |  |

ARTIFICIAL INTELLIGENCE BASED IMAGE DATA PROCESSING METHOD AND IMAGE PROCESSING DEVICE

CROSS REFERENCE TO RELATED APPLICATION

The present application claims priority to U.S. Provisional Patent Application No. 62/569,618, filed Oct. 9, 2017, entitled "Vision bridge chip with artificial intelligence," the disclosure thereof incorporated by reference herein in its entirety.

FIELD OF THE INVENTION

This disclosure generally relates to image data processing methods based on artificial intelligence and image data processing devices configured to perform the same.

BACKGROUND

Vision is one of the most important way to obtain information, for both human world, and machine world. In today's machine vision world, vision systems typically use a traditional image sensor as a front-end. A key trade-off of the traditional image sensor is mismatch of resolution achievable by the image sensor and bandwidth of a data communication link achievable thereby. Specifically, in many cases, the system is capable of processing high-resolution image and/or video, but the limited bandwidth of the data communication link of the existing infrastructure may cause a significant latency in transmitting the high-resolution image and/or video. For example, the conventional wired and wireless network speed amounts to approximately 2 Meg-pixel 30 FPS, although conventional image sensors may be able to process image data at a 20 Meg-pixel 30 FPS.

SUMMARY

Various embodiments of the present disclosure can include image data processing methods based on artificial intelligence and image data processing devices configured to perform the methods. According to one aspect, an exemplary image data processing method may include receiving, from an image sensor, frame image data of a frame at a first resolution, reducing a resolution of the frame image data to a second resolution, performing an artificial intelligence (AI) based image recognition on the frame image data at the second resolution to determine one or more regions of interest (ROI) and a priority level of each of the one or more ROIs, and extracting portions of the frame image data corresponding to the one or more ROIs. The exemplary image data processing method may further include modifying a resolution of the portions of the frame image data corresponding to the one or more ROIs based on the priority level of each of the one or more ROIs, and combining the resolution-modified portions of the frame image data corresponding to the one or more ROIs with the frame image data at the second resolution to generate output frame image data.

In some embodiments, the image data processing method may further include modifying at least one of brightness and contrast of the portions of the frame image data corresponding to the one or more ROIs. The portions of the frame image data corresponding to the one or more ROIs of which at least one of brightness and contrast has been modified may be combined with the frame image data at the second resolution to generate the output frame image data.

In some embodiments, the one or more ROIs may include a first ROI at a first priority level and a second ROI at a second priority level lower than the first priority level. In some embodiments, the modifying resolution of the portions of the frame image data corresponding to the one or more ROIs may include maintaining a resolution of a portion of the frame image data corresponding to the first ROI at the first resolution, and reducing a resolution of a portion of the frame image data corresponding to the second ROI to a third resolution lower than the first resolution and higher than the second resolution. In some embodiments, the modifying resolution of the portions of the frame image data corresponding to the one or more ROIs may include reducing a resolution of a portion of the frame image data corresponding to the first ROI to a third resolution lower than the first resolution and higher than the second resolution, and reducing a resolution of a portion of the frame image data corresponding to the second ROI to a fourth resolution lower than the third resolution and higher than the second resolution.

In some embodiments, the image sensor may be mounted on a vehicle or robot, and the one or more ROIs corresponds to one or more regions including at least one of a human face, a traffic sign, and a license plate.

In some embodiments, the frame image data may be received from the image sensor through a first data communication link of a first bandwidth, and the output frame image data may be output through a second data communication link of a second bandwidth lower than the first bandwidth. In some embodiments, the first data communication link may comprise a wired data communication link, including no wireless communication link, and the second data communication link may comprise a wireless data communication link.

In some embodiments, the image data processing method may further include transmitting an image data signal containing the output frame image data. The output frame image data in the image data signal may include a sequence of blocks of row data corresponding to a plurality of rows of the image sensor, and each block of row data includes image data at the second resolution and image data corresponding to the one or more ROIs.

In some embodiments, the image data processing method may further include transmitting an image data signal containing the output frame image data of the second frame. The output frame image data in the image data signal may include a first sequence of blocks of row data corresponding to a plurality of rows of the image sensor and a second sequence of blocks of row data corresponding to the plurality of rows. The first sequence of blocks of row data may include image data of each of the rows at the second resolution, and the second sequence of blocks of row data may include image data of each of the rows corresponding to the one or more ROIs.

In some embodiments, the image data processing method may further include receiving an external ROI request, and extracting one or more portions of the frame image data based on the external ROI request.

According to another aspect, the present disclosure provides an image data processing device including a first resolution modification unit, a feature detection unit, a second resolution modification unit, and a data combination unit. The first resolution modification unit may be configured to receive, from an image sensor, frame image data at a first resolution, and reduce a resolution of the frame image data to a second resolution. The feature detection unit may be configured to perform an artificial intelligence (AI) based image recognition on the frame image data at the second resolution to determine one or more regions of interest (ROI) and a priority level of each of the one or more ROIs. The second resolution modification unit may be configured to extract portions of the frame image data corresponding to the one or more ROIs, and modify a resolution of the portions of the frame image data corresponding to the one or more ROIs based on the priority level of each of the one or more ROIs. The data combination unit may be configured to combine the resolution-modified portions of the frame image data corresponding to the one or more ROIs with the frame image data at the second resolution to generate output frame image data.

In some embodiments, the image sensor may further include a pre-processing unit configured to modify at least one of brightness and contrast of the portions of the frame image data corresponding to the one or more ROIs. The data combination unit may combine the portions of the frame image data corresponding to the one or more ROIs of which at least one of brightness and contrast has been modified with the frame image data at the second resolution to generate the output frame image data.

In some embodiments, the second resolution modification unit may be configured to maintain a resolution of a portion of the frame image data corresponding to the first ROI at the first resolution, and reduce a resolution of a portion of the frame image data corresponding to the second ROI to a third resolution lower than the first resolution and higher than the second resolution. In some embodiments, the second resolution modification unit may be configured to reduce a resolution of a portion of the frame image data corresponding to the first ROI to a third resolution lower than the first resolution and higher than the second resolution, and reduce a resolution of a portion of the frame image data corresponding to the second ROI to a fourth resolution lower than the third resolution and higher than the second resolution.

In some embodiments, the first resolution modification unit may receive the frame image data from the image sensor through a first data communication link of a first bandwidth, and the data combination unit may be configured to output the output frame image data through a second data communication link of a second bandwidth lower than the first bandwidth.

In some embodiments, the data combination unit may be further configured to transmit an image data signal containing the output frame image data of the second frame. The output frame image data in the image data signal may include a sequence of blocks of row data corresponding to a plurality of rows of the image sensor array, and each block of row data may include image data at the second resolution and image data corresponding to the one or more ROIs.

In some embodiments, the data combination unit may be further configured to transmit an image data signal containing the output frame image data of the second frame. The output frame image data in the image data signal may include a first sequence of blocks of row data corresponding to a plurality of rows of the image sensor array and a second sequence of blocks of row data corresponding to the plurality of rows. The first sequence of blocks of row data may include image data of each of the rows at the second resolution, and the second sequence of blocks of row data including image data of each of the rows corresponding to the one or more ROIs.

In some embodiments, the second resolution modification unit may be further configured to receive an external ROI request. The second resolution modification unit may extract one or more portions of the frame image data based on the external ROI request.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

One or more of the various embodiment of the present disclosure is directed to enabling transmission of frame image data with a reduced resolution than a resolution of original frame image data obtained from an image sensor for transmitting through a data communication link having a narrow bandwidth. At the same time one or more of the various embodiment of the present disclosure is directed to maintaining specificity of key contents contained in the original frame image data without losing the specificity by reducing the resolution.

According to some embodiments, one or more regions of interest (ROI) are determined by employing an AI-based image recognition technique, and image data corresponding to the ROI are obtained at resolutions corresponding to a priority level of the ROIs, while the entire frame image data is obtained at a reduced resolution. According to such combined image data of different resolution, it is possible to obtain frame image data that can be transmitted through a data communication link of a narrow bandwidth, while maintaining specificity of key contents of the frame image data. In some embodiments, an image data processing device connectable to an image sensor and configured to carry out an AI-based image recognition may be mounted on a robot or a vehicle, such as an autonomous vehicle, and frame image data obtained from the image data processing device is transmitted to a local system and further a cloud system for further image processing. When the image data processing device is mounted on a vehicle, the key contents of frame image data may include valuable road information, such as faces of drivers and/or passengers on other vehicles, traffic signals and signs, and license plates.

Figure 1:
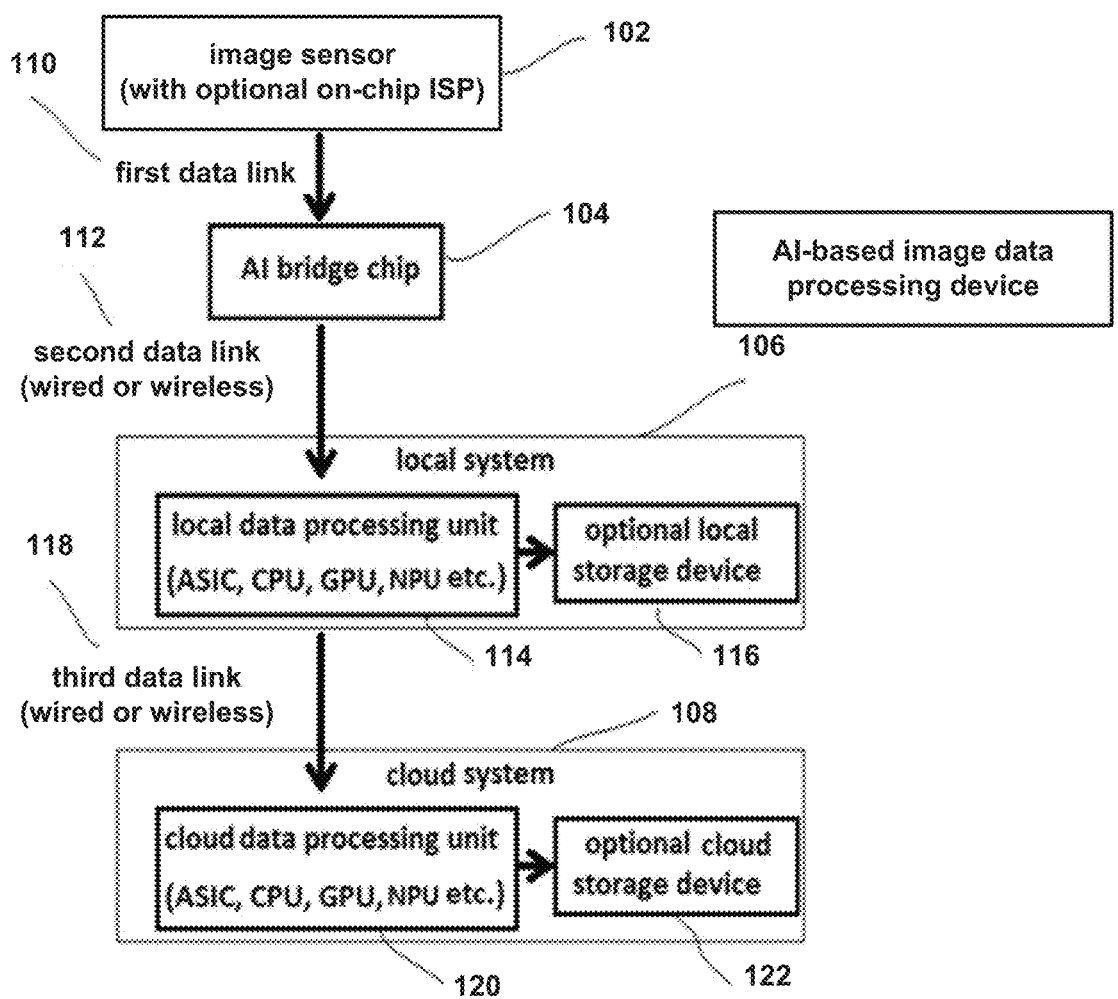
FIG. 1 illustrates an exemplary system for processing video frame image data captured by an image sensor according to various embodiments.

FIG. 1 illustrates an exemplary system 100 for processing video frame image data captured by an image sensor according to various embodiments. In FIG. 1, the system 100 includes an image sensor 102, an artificial intelligence (AI) based image data processing device (AI Bridge Chip) 104, a local system 106, and a cloud system 108.

The image sensor 102 is configured to obtain original video frame data from the real world. In some embodiments, the image sensor 102 is formed as a chip on which an image sensor array is disposed. In a specific implementation, the image sensor 102 also includes an image signal processor (ISP) on the chip to carry out the image data processing. In a specific implementation, the image sensor 102 may be mounted on an autonomous vehicle to capture surrounding images thereof. The output image data from the image sensor 102 may be either raw or ISP processed format, such as YUV, or Motion-JPEG. The output image data from the image sensor 102 is transmitted through a first data link 110 to the AI based image data processing device 104. The first data link 110 has a sufficient bandwidth to transmit image data obtained from the image sensor 102 without data overflow, and has a sufficient shorter length to avoid communication delay.

The AI-based image data processing device 104 is configured to carry out an AI-based image data processing. In some embodiments, the AI-based image data processing device 104 may be referred to as an AI bridging device, because the AI-based image data processing device 104 serves as a bridge between the image sensor 102 and the local system 106 for enabling communication without data overflow because of a narrow bandwidth of a second data link 112. The AI-based image data processing device 104 is configured to obtain original video frame image data from the image sensor 102, pre-processes the obtained original video frame image data to extract key information, and remove redundant data. Through the pre-processing, the AI-based image data processing device 104 is configured to reduce the bandwidth from original video frame data to a lower bandwidth data stream which can be transferred through the second data link 112. In some embodiments, in extracting key information, the AI-based image data processing device 104 is configured to determine which part of the obtain original video frame data may contain key image data and needs to be kept, and non-key image data that may be compressed to reduce the overall data bandwidth. More detail of the AI-based image data processing will be described below with reference to FIG. 2.

In some embodiments, the AI-based image data processing device 104 is formed as a chip separate from a chip in which the image sensor 102 is disposed. The output image data from the AI-based image data processing device 104 is transmitted through the second data link 112 to a local data processing unit 114 in the local system 106. The second data link 112 may be a wired link or a wireless link, and the wireless link may be any applicable wireless data communication link such as a WiFi, Bluetooth, ZigBee, etc.

The local system 106 represents a computing system disposed proximate to the image sensor 102 and/or the AI-based image data processing device 104 and configured to perform additional image data processing for various applicable purposes. For example, when the AI-based image data processing device 104 is mounted on a vehicle to capture images of surrounding environments, the local system 106 may be a computing system configured to perform an autonomous driving operation of the vehicle based on output image data from the AI-based image data processing device 104. In some embodiments, the local data processing unit 114 is implemented as a field-programmable gate array (FPGA), a graphics processing unit (GPU), a tensor processing unit (TPU), a network processing unit (NPU), and/or a central processing unit (CPU).

In some embodiments, the image sensor 102 may be manufactured using a mixed-signal silicon process, e.g., 90 nm mixed-signal process, which supports both digital MOSFET and analog MOSFET as sensor elements of the image sensor 102. To the contrary, the local data processing unit 114 may be manufactured using digital MOSFET. For that reason, a highly advanced silicon process, e.g., 14 nm process, may be employed to achieve high performance. Therefore, in some embodiments, it may be preferable to dispose the ISP in the local system 106 rather than to use an on-chip ISP within the image sensor 102.

The local system 106 may also include an optional local storage device 116 for storing image data processed by the local data processing unit 114. The bandwidth of the second data link 112 and/or the processing power of the local data processing unit 114 is typically limited. As a result, the resolution and frame rate of the image sensor 102 that can be effectively utilized may be largely limited in many applications. Output image data of the local system 106 is transmitted through a third data link 118 to the cloud system 108.

The cloud system 108 represents a computing system disposed separately from the local system 106 and the AI-based image data processing device 104 and configured to perform additional image data processing for various applicable purposes. For example, when the local system 106 is mounted on an autonomous vehicle to capture images of surrounding environments, the cloud system 108 may be a server computing system configured to perform data analysis of autonomous driving operations by the local system 106 and/or image data obtained from the local system 106. The data analysis may include traffic analysis, monitoring of vehicles, humans, animals, etc. The cloud system 108 includes a cloud data processing unit 120 and an optional cloud storage device 122. In some embodiments, the cloud data processing unit 120 has a more powerful processing power than the local data processing unit 114 and the optional cloud storage device 122 has a larger storage capacity than the optional local storage device 116. In a specific implementation, the bandwidth of the third data link 118 may be significantly limited in comparison to the processing power of the local data processing unit 114.

Figure 2:
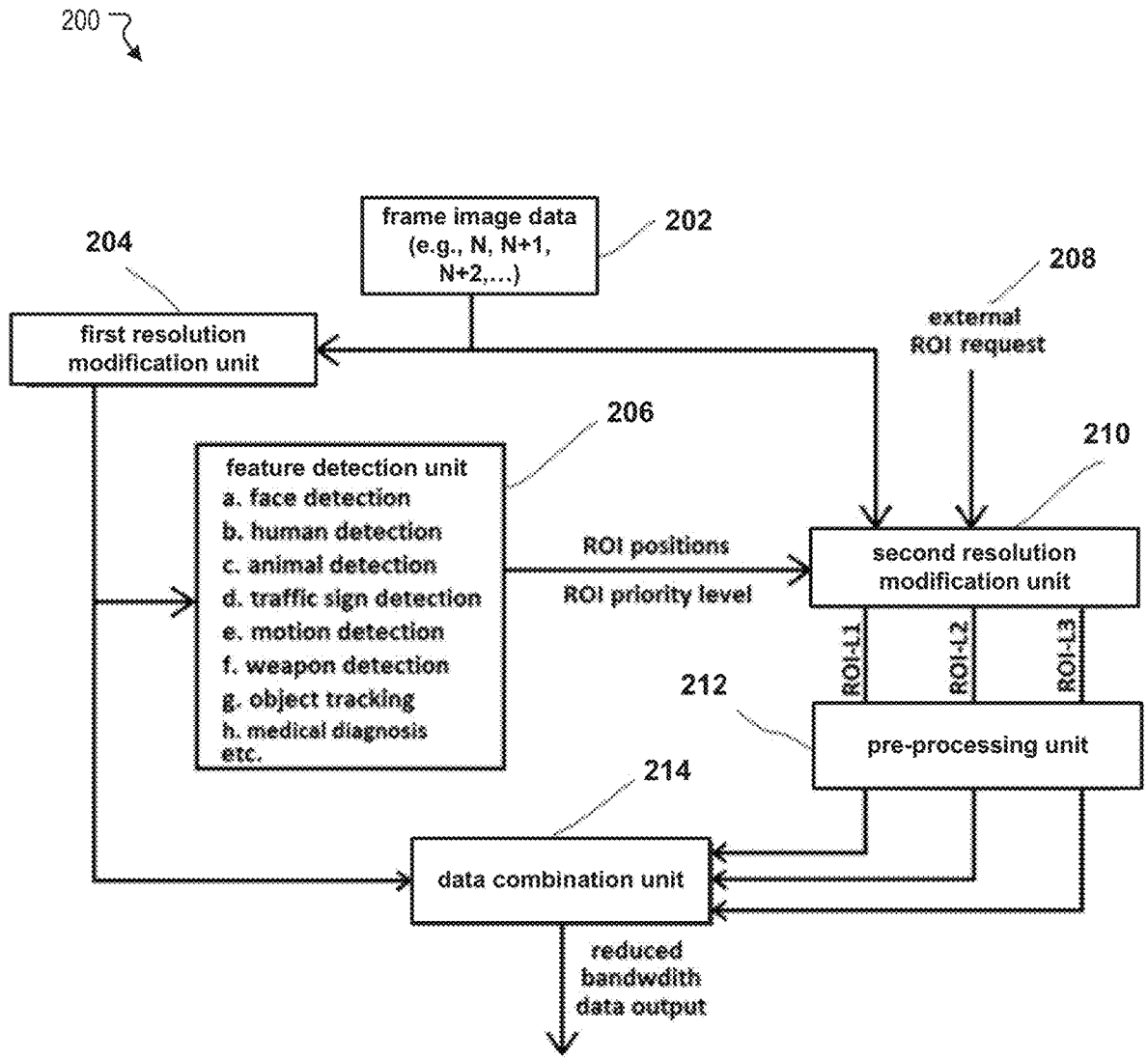
FIG. 2 illustrates an exemplary data flow to and from an AI-based image data processing device according to various embodiments.

FIG. 2 illustrates an exemplary data flow 200 in an AI-based image data processing device according to various embodiments. According to the exemplary data flow 200, size of video frame image data is reduced so as to conform to the bandwidth of a data communication link for output. The AI-based image data processing device includes a first resolution modification unit 204, a feature detection unit 206, a second resolution modification unit 210, a pre-processing unit 212, and a data combination unit 214. Each of the first resolution modification unit 204, the feature detection unit 206, the second resolution modification unit 210, the pre-processing unit 212, and the data combination unit 214 may be configured by a specifically configured circuitry and/or a software-based computer system described below with reference to FIG. 11.

In FIG. 2, frame image data 202 at a first resolution are received from an image sensor array of an image sensor. The frame image data 202 are constantly supplied from the image sensor array as a sequence of frame image data to the first resolution modification unit 204.

The first resolution modification unit 204 is configured to reduce the overall resolution of input frame image data to a second resolution lower than the first resolution. Here, resolution refers to a definition of frame image data and/or a frame rate of a sequence of frame image data. For example, the definition can be represented by a number of pixels per shorter edge of a screen (e.g., 720, 1080, 1920, etc.), the frame rate can be represented by a number of frames in a second (e.g., 60, 120, 240, etc.). For example, the first resolution is higher than the second resolution in one or both of the definition and frame rate. In reducing the overall resolution of input frame image data, the first resolution modification unit 204 may employ a scale down ISP algorithm. The first resolution modification unit 204 may reduce the overall resolution of input frame image data to a bandwidth that one or more data links for outputting frame image data (e.g., the second data link 112 and/or the third data link 118 in FIG. 1) are capable transmitting without data overflow. Further, this reduction of the resolution of input frame image data can lead to reduction of data to be processed within the AI-based image data processing device, so that the AI-based data processing device can be implemented at low cost, with low power consumption and a small die size form. The resolution-reduced frame image data are input to the feature detection unit 206.

The feature detection unit 206 is configured to perform an artificial intelligence (AI) based image recognition on the frame image data 202 at the second resolution to determine one or more regions of interest (ROI) and a priority level of each of the one or more ROIs. Depending on the specific frame image data, the feature detection unit 206 may determine that no ROI is in the frame image data. In carrying out the AI-based image recognition, the feature detection unit 206 may determine positions of the determined ROIs. The priority level of the one or more ROIs may correspond to importance of the ROI for which more processing power should be used to analyze image and/or a clearer image should be obtained for the analysis. In a specific implementation, the AI-based image recognition may involve one or more of face detection, human detection, animal detection, traffic sign detection, motion detection, object tracking, and medical diagnosis, etc. The feature detection unit 206 is disposed a chip different from a chip of the image sensor and connected through a data link. The feature detection unit 206 outputs the one or more ROIs and a position and a priority level of each of the one or more ROIs to the second resolution modification unit 210.

The second resolution modification unit 210 is configured to receive, from the image sensor, the frame image data 202 at the first resolution, and flexibly reduce a resolution of the received frame image data 202. In some embodiments, in flexibly reducing the resolution of the received frame image data 202, the second resolution modification unit 210 is configured to extract portions of the frame image data 202 corresponding to the one or more ROIs, and reduce a resolution of the portions of the frame image data 202 corresponding to the one or more ROIs based on the priority level of each of the one or more ROIs. The second resolution modification unit 210 outputs the resolution-reduced portions of the frame image data 202 corresponding to the one or more ROIs to the pre-processing unit 212.

For example, it is assumed that the one or more ROIs includes a first ROI at a first priority level (ROI-L1) and a second ROI at a second priority level (ROI-L2) lower than the first priority level. In such a case, the second resolution modification unit 210 may maintain a resolution of a portion of the frame image data 202 corresponding to the first ROI at the first resolution, and reduce a resolution of a portion of the frame image data 202 corresponding to the second ROI to a third resolution lower than the first resolution and higher than the second resolution. Alternatively, the second resolution modification unit 210 may reduce a resolution of a portion of the frame image data 202 corresponding to the first ROI to a third resolution lower than the first resolution and higher than the second resolution, and reduce a resolution of a portion of the frame image data 202 corresponding to the second ROI to a fourth resolution lower than the third resolution and higher than the second resolution. It is noted that the number of priority levels is not specifically limited, and three or more priority levels (e.g., ROI-L1, ROI-L2, ROI-L3) may be set.

In some embodiments, the second resolution modification unit 210 is configured to receive an external ROI request 208 and extract one or more portions of the frame image data 202 based on the external ROI request 208. In a specific implementation, the external ROI request 208 may designate a specific region of a frame represented by the frame image data 202 and/or a specific type of object (e.g., face, human traffic sign, license plates, etc.) to be extracted from the second image data. This employment of the external ROI request 210 may open the possibility of external, local, or cloud computational power with more advanced algorithms, and resources can be used to detect the important ROIs. The response time of that external loop is slower than the on-chip functions, but the algorithm used in the external loop can be more complex and accurate, which is a big enhancement for the AI-based image sensor.

The pre-processing unit 212 is configured to perform pre-processing with respect to the portions of the frame image data 202 corresponding to the one or more ROIs. In performing pre-processing, the pre-processing unit 212 may modify one of brightness and contrast of the portions of the frame image data 202 corresponding to the one or more ROIs. In some embodiments, in output video frame image data supplied from an image sensor array, the brightness and contrast of an image may be determined by the overall scene of the whole frame. For that reason, some ROIs may be in shadow area and too dark, while some other ROIs may be in too-bright area and nearly saturated. Both can disable effective image processing of the frame image data. Here, since the ROIs have been determined by the feature extraction unit 206, the pre-processing unit 212 can take advantage of the localized scene information of the ROIs, i.e., do not need to consider the scene outside of the ROIs, then the brightness and/or contrast can be optimized based on the ROIs or even some target feature area within the ROIs only. Other imaging processing algorithms, such as gamma, edge enhancement, etc., may also be applied to the preprocessing by the pre-processing unit 212. As a result, the ROI image can become clearer to be processed by any additional visual algorithms in the higher vision system level.

The data combination unit 214 is configured to combine the resolution-modified portions of the frame image data 202 corresponding to the one or more ROIs with the frame image data of the same frames at the second resolution to generate output frame image data. Specifically, the data combination unit 214 receives the resolution-modified portions of the frame image data 203 corresponding to the one or more ROIs transmitted from the second resolution modification unit 210 (and through the pre-processing unit 212), and receives the frame image data of the same frame at the second resolution from the first resolution modification unit 204. In combining data, the data combination unit 214 may generate an image data signal containing the output frame image data. A specific example of the image data signal will be described below with reference to FIGS. 5 and 6.

Figure 3:
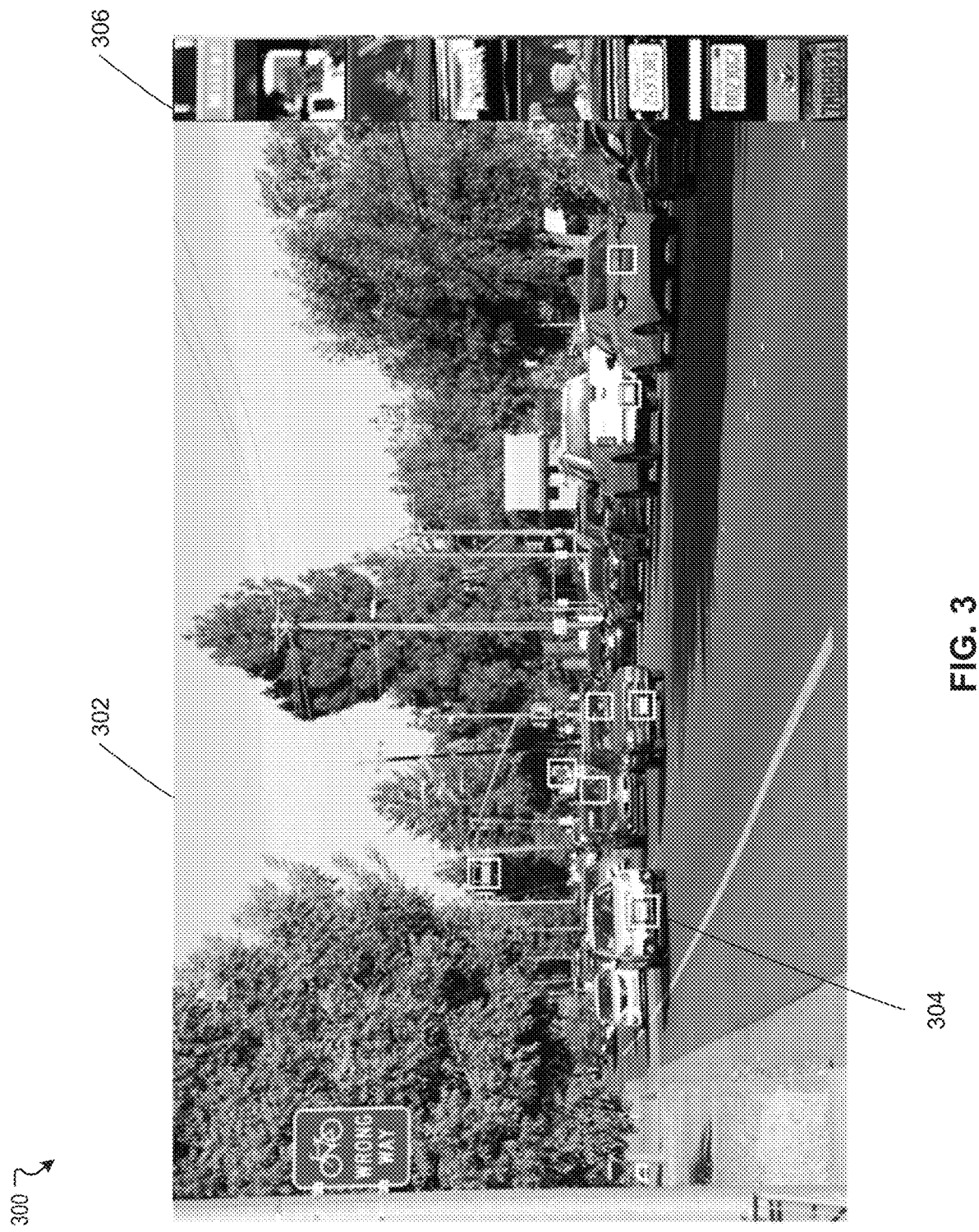
FIG. 3 illustrates an exemplary video frame image in which regions of interest (ROI) are determined and enlarged images of the ROIs.

FIG. 3 illustrates an exemplary video frame image 300 in which regions of interest (ROI) are determined and enlarged images of the ROIs. In a specific implementation, the video frame image 300 may correspond to a frame image generated based on output frame image data output from an AI-based image data processing device according to some embodiments. The video frame image 300 includes a main frame image 302 including ROIs 304, and separate ROI images 306.

An AI-based image data processing device according to some embodiments is configured to reduce a resolution of frame image data. The main frame image 302 corresponds to an image generated from frame image data of the reduced resolution and is displayed as a standard 720p format, which is about 1-meg pixels per frame. The AI-based image data processing device according to some embodiments is further configured to detect one or more regions including at least one of a human face, a traffic sign, and a license plate as ROIs. As a result of the detection, the AI-based image data processing device determines locations of the ROI in the frame image, namely the ROIs 304 (the rectangular regions) in the main frame image 302. Depending on a specific implementation, any applicable shape of the ROI can be employed. The AI-based image data processing device according to some embodiments is further configured to receive frame image data at a non-modified resolution and extract portions of the frame image data corresponding to the one or more ROIs. The separate ROI images 306 correspond to images of the ROIs generated based on the extracted portions of the frame image data corresponding to the one or more ROIs.

In this example, the image sensor array of the image sensor and/or the data link (e.g., the first data link 110 in FIG. 1) extending from the image sensor is capable of capturing 16-meg pixels per frame, whereas the bandwidth of the data link (e.g., the second data link 112 in FIG. 1) connected between the AI-based image data processing device to a subsequent system is limited to handle a 720p-frame image. According to the AI-based image data processing device, it is possible to determine the one or more ROIs and extract portions corresponding to the ROIs from higher-resolution frame image data, e.g., the original 16-meg resolution data, and generate output frame image data based on the resolution-modified frame image data corresponding to the main frame image 302 and the higher-resolution frame image data corresponding to the separate ROI images 306. Such combined frame image data are reduced in size sufficiently so as not to cause data overflow in transmitting through the data link. In the above example, the overall bandwidth can be reduced into $\frac{1}{16}$. Moreover, ROIs that cannot be displayed clearly with the resolution-modified frame image data can be displayed more clearly with the higher-resolution frame image data. Further, a higher level visual system that receives such combined frame image data can more effectively perform post-processing and find the useful information.

Figure 4:
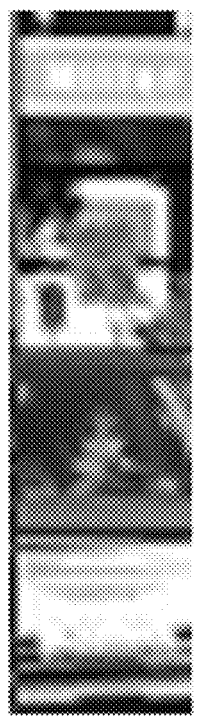
FIG. 4 illustrates a diagram showing an exemplary comparison between enlarged images of ROIs according to a conventional image processing process and an AI-based image data processing process according to various embodiments.
Figure 4:
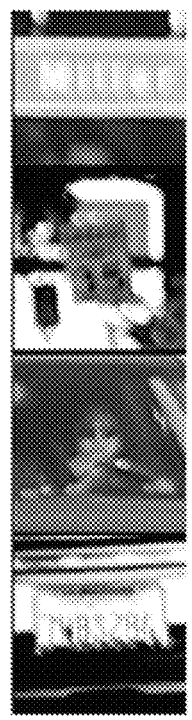
Figure 4:
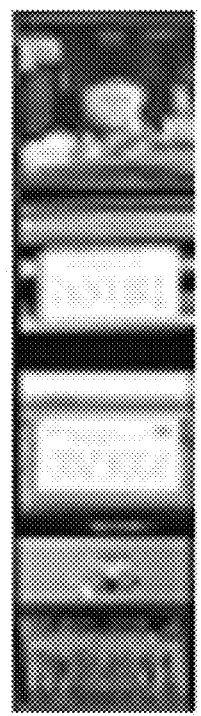
Figure 4:

FIG. 4 illustrates a diagram 400 showing an exemplary comparison between enlarged images of ROIs according to a conventional image processing process and an AI-based image data processing process according to various embodiments. FIG. 4 illustrates ROI images generated based on resolution-modified frame image data for transmitting through a data link (referred to as "traditional") and ROI images generated based on higher-resolution frame image data (referred to as "AI extracted"). As seen from FIG. 4, clearer ROI images can be generated from the higher-resolution frame image data. Such clearer ROI can provide more substantial information in the ROIs, such as a human face sufficient to identify the person, a facial expression sufficient to analyze a human emotion, eye directions, and letters on objects (e.g., traffic signs and license plates).

Figure 5:
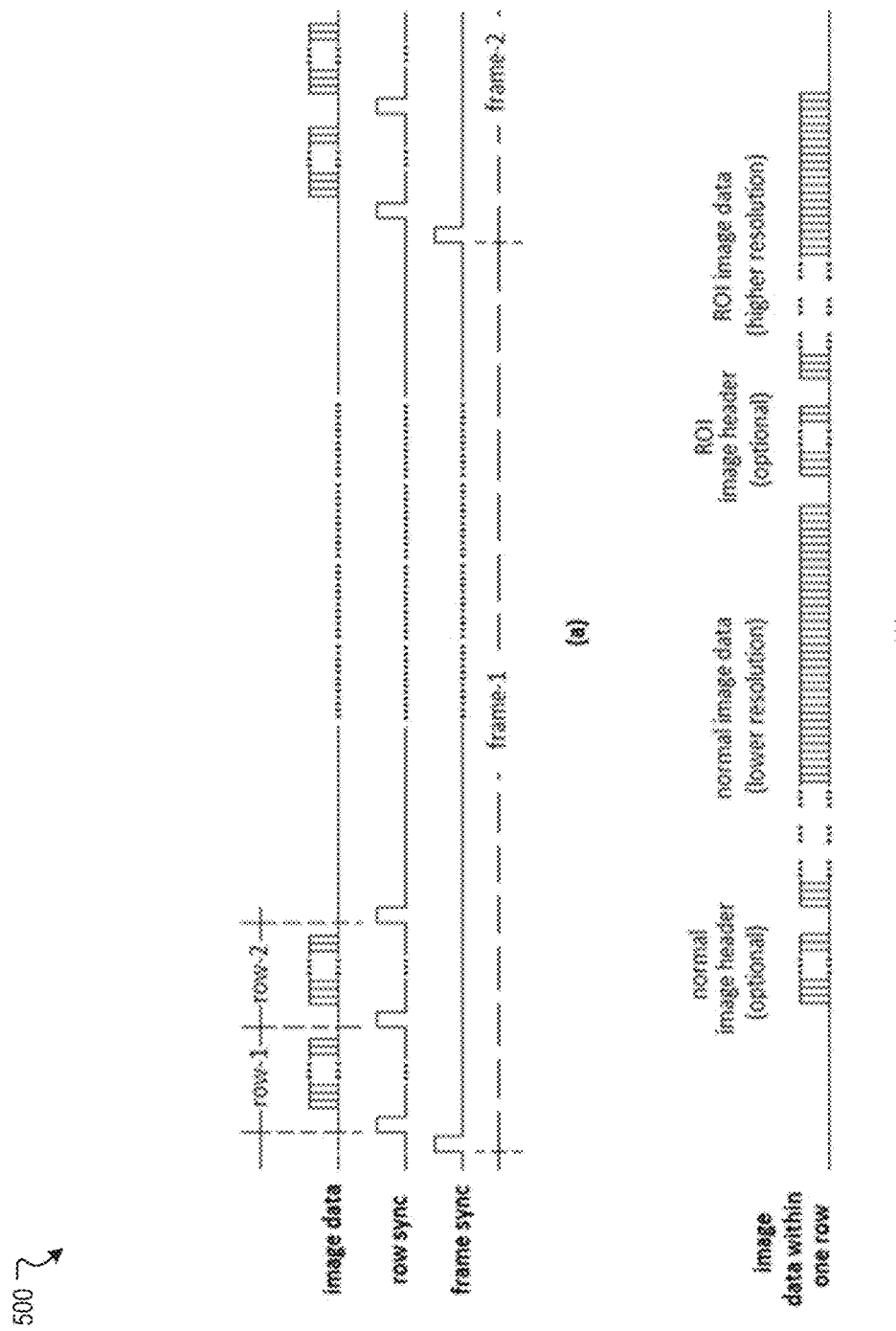
FIG. 5 illustrates an exemplary signal timing diagram of signals processed to output frame image data from an AI-based image data processing device according to various embodiments.

FIG. 5 illustrates an exemplary signal timing diagram 500 of signals processed to output frame image data from an AI-based image data processing device according to various embodiments. (a) of FIG. 5 illustrates a frame sync signal, a row sync signal, and an image data signal that are employed to output a sequence of frame image data. The row sync signal is asserted each time a block of frame image data corresponding to one row is output. The frame sync signal is asserted each time frame image data corresponding to one frame is output. As a result, a sequence of blocks of image data (row data) corresponding to a plurality of rows is output with respect to each frame. The output may be through parallel ports, e.g., image data may have 10-bits and output as 10 data lines as data<9:0>. Alternatively, the output may employ serial link protocol such as Mobile Industry Processor Interface (MIPI) or Low-voltage differential signaling (LVDS), which combines the parallel data lines into high speed serial data and clock lines.

(b) of FIG. 5 illustrates image data corresponding to one row, e.g., a block of row data. The block of row data includes image data at a reduced resolution (referred to as "normal image data")) followed by image data corresponding to the one or more ROIs (referred to as "ROI image data"). Depending on a specific implementation, with respect one or more rows, the image data corresponding to the one or more ROIs may be output before, after, or in between the image data at the reduced resolution. In the example of (b) of FIG. 5, a header may be output before the normal image data and/or before the ROI image data. The header can indicates the type of the data, i.e., normal or ROI, and can also contain other related information, e.g., a position of the ROI in the original frame, a priority level of ROI, etc.

Figure 6:
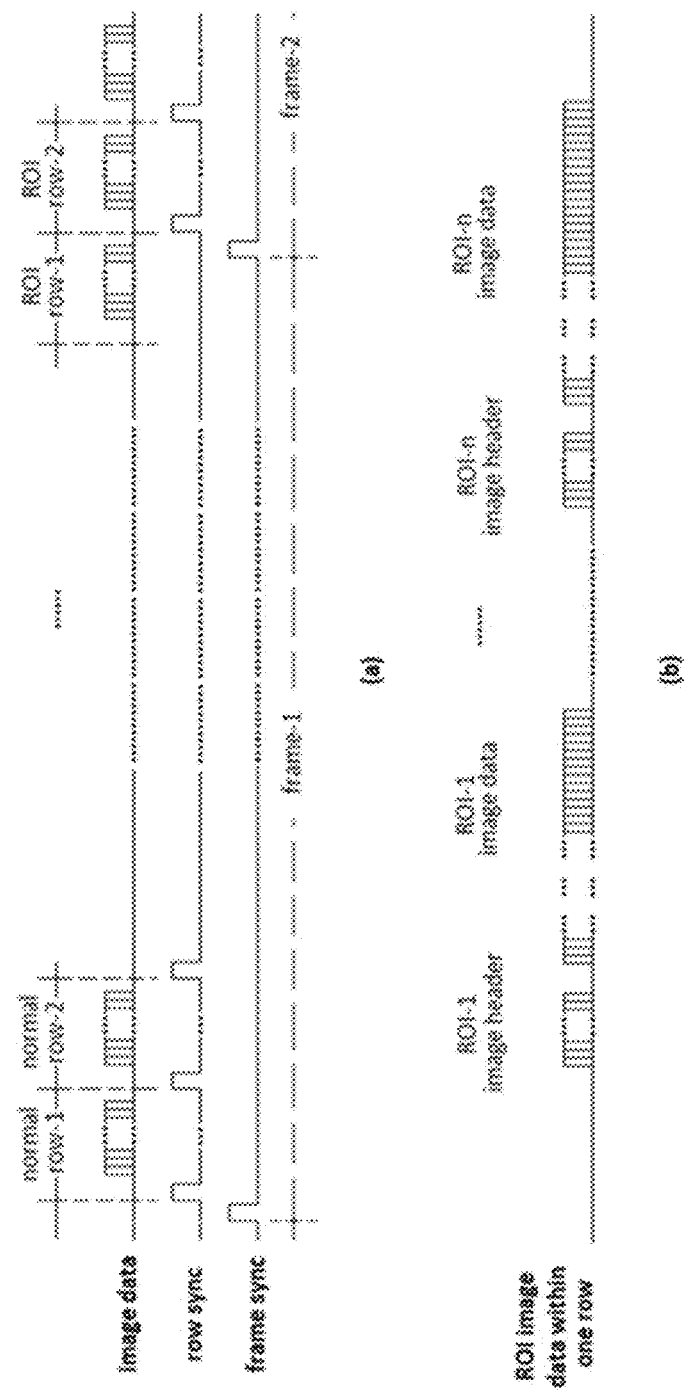
FIG. 6 illustrates another exemplary signal timing diagram of signals processed to output frame image data from an AI-based image data processing device according to various embodiments.

FIG. 6 illustrates another exemplary signal timing diagram 600 of signals processed to output frame image data from an AI-based image data processing device according to various embodiments. (a) of FIG. 6 illustrates a frame sync signal, a row sync signal, and an image data signal that are employed to output a sequence of frame image data. The row sync signal is asserted each time a block of frame image data corresponding to one row is output. The frame sync signal is asserted each time frame image data corresponding to one frame is output. As a result, a sequence of blocks of image data (row data) corresponding to a plurality of rows is output with respect to each frame. With respect to each frame, image data at a reduced resolution (not shown) for all rows of the frame are output, followed by image data corresponding to the one or more ROIs (referred to as "ROI image data") for all rows of the frame row by row. The assertion of the row sync signal and the frame sync signal is carried out in the same manner as that of the row sync signal and the frame sync signal in FIG. 5.

(b) of FIG. 6 illustrates image data corresponding a plurality of ROIs in one row. The image data corresponding the plurality of ROIs in one row includes a plurality of blocks of image data corresponding to the plurality of ROIs, respectively. The order of the plurality of blocks of image data corresponding to the plurality of ROIs is not particularly limited. For example, the plurality of blocks of image data corresponding to the plurality of ROIs may be output in the order of the priority level (e.g., higher to lower, or lower to higher). In another example, the plurality of blocks of image data corresponding to the plurality of ROIs may be output in the order of the types of ROIs (e.g., face, license plate, traffic sign, etc.). In the example of (b) of FIG. 6, a header may be output before the normal image data and/or before the ROI image data. The header can indicates the type of the data, i.e., normal or ROI, and can also contain other related information, e.g., a position of the ROI in the original frame, a priority level of ROI, etc. According to the manner of outputting frame image data according to this example, the ROI can point to any position within the same frame.

Figure 7:
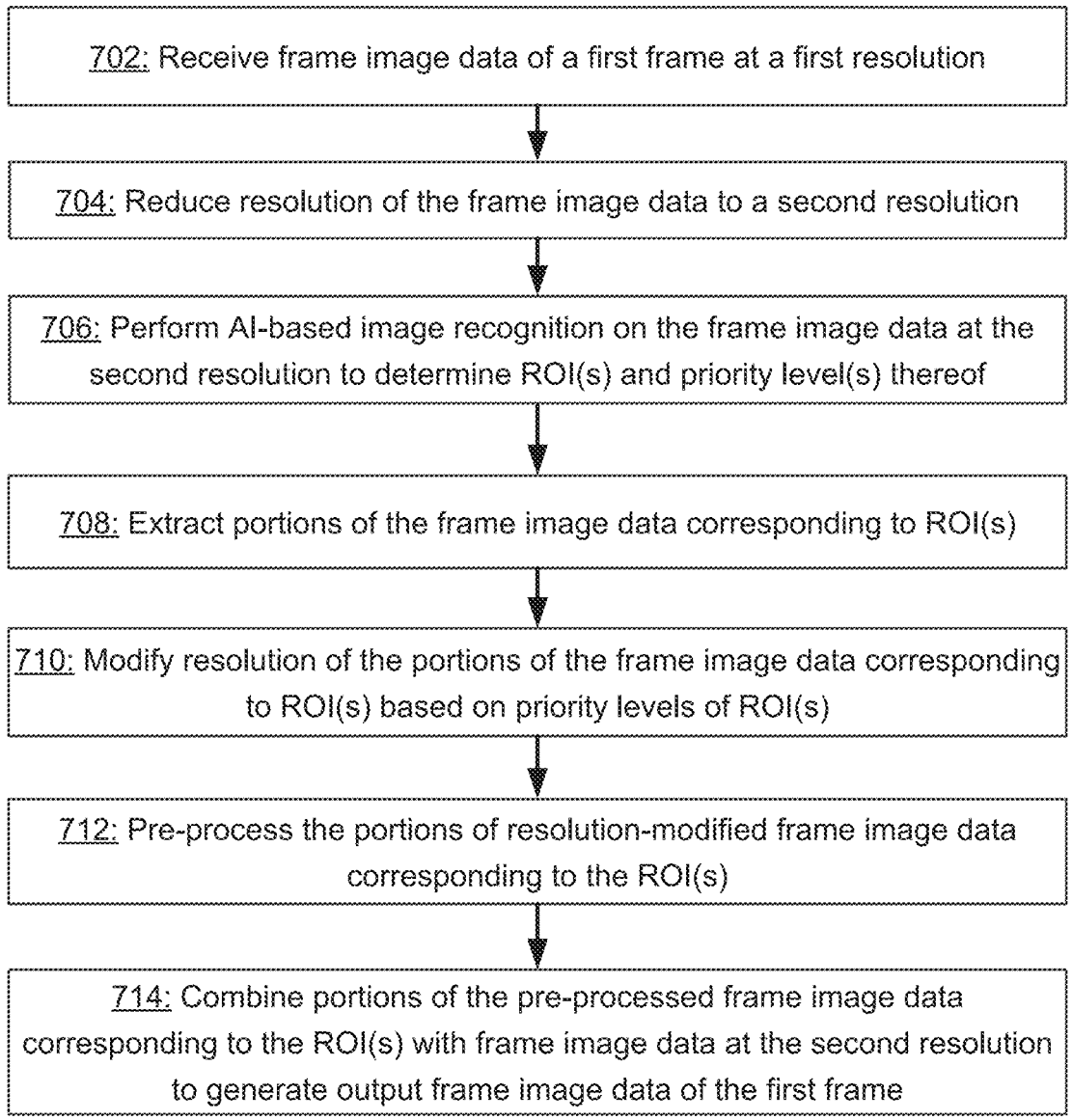
FIG. 7 illustrates a flowchart of an exemplary image data processing method according to various embodiments.

FIG. 7 illustrates a flowchart 700 of an exemplary image data processing method 700 according to various embodiments. The exemplary method may be implemented in various environments including, for example, the functional units of the AI-based image data processing device illustrated in FIG. 2. The operations of the exemplary method presented below are intended to be illustrative. Depending on the implementation, the exemplary method may include additional, fewer, or alternative steps performed in various orders or in parallel. Also, this flowchart illustrates blocks (and potentially decision points) organized in a fashion that is conducive to understanding. It should be recognized, however, that the blocks can be reorganized for parallel execution, reordered, modified (changed, removed, or augmented), where circumstances permit. Hereinafter, the exemplary image data processing method includes blocks to obtain output frame image data of a single frame.

The flowchart 700 starts at block 702, with receiving frame image data at a first resolution. In a specific implementation, a resolution modification unit (e.g., the first resolution modification unit 204 in FIG. 2) receives the frame image data at the first resolution from an image sensor.

The flowchart 700 continues to block 704, with reducing a resolution of the frame image data to a second resolution. In a specific implementation, a resolution modification unit (e.g., the first resolution modification unit 204 in FIG. 2) reduces a resolution of the frame image data to a second resolution.

The flowchart 700 continues to block 706, with performing AI-based image recognition on the frame image data at the second resolution to determining ROI(s) and priority level(s) thereof. In a specific implementation, a feature detection unit (e.g., the feature detection unit 206 in FIG. 2) performs the AI-based image recognition on the frame image data at the second resolution to determining ROI(s) and priority level(s) thereof.

The flowchart 700 continues to block 708, with extracting portions of the frame image data corresponding to ROI(s). In a specific implementation, a resolution modification unit (e.g., the second resolution modification unit 210 in FIG. 2) extracts the portions of the frame image data corresponding to the ROI(s).

The flowchart 700 continues to block 710, with modifying a resolution of the portions of the frame image data corresponding to ROI(s) based on priority levels of ROI(s). In a specific implementation, a resolution modification unit (e.g., the second resolution modification unit 210 in FIG. 2) modifies the resolution of the portions of the frame image data corresponding to the ROI(s) based on the priority levels of the ROI(s).

The flowchart 700 continues to block 712, with pre-processing the portions of resolution-modified frame image data corresponding to the ROI(s). In a specific implementation, a pre-processing unit (e.g., the pre-processing unit 212 in FIG. 2) modifies the resolution of the portions of the frame image data corresponding to the ROI(s) based on the priority levels of the ROI(s).

The flowchart 700 continues to block 714, with combining portions of the pre-processed frame image data corresponding to the ROI(s) with frame image data at the second resolution to generate output frame image data. In a specific implementation, a data combination unit (e.g., the data combination unit 214 in FIG. 2) combines the portions of the pre-processed frame image data corresponding to the ROI(s) with the frame image data at the second resolution to generate the output frame image data.

One or more of the functionalities of the AI-based image sensor described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 8:
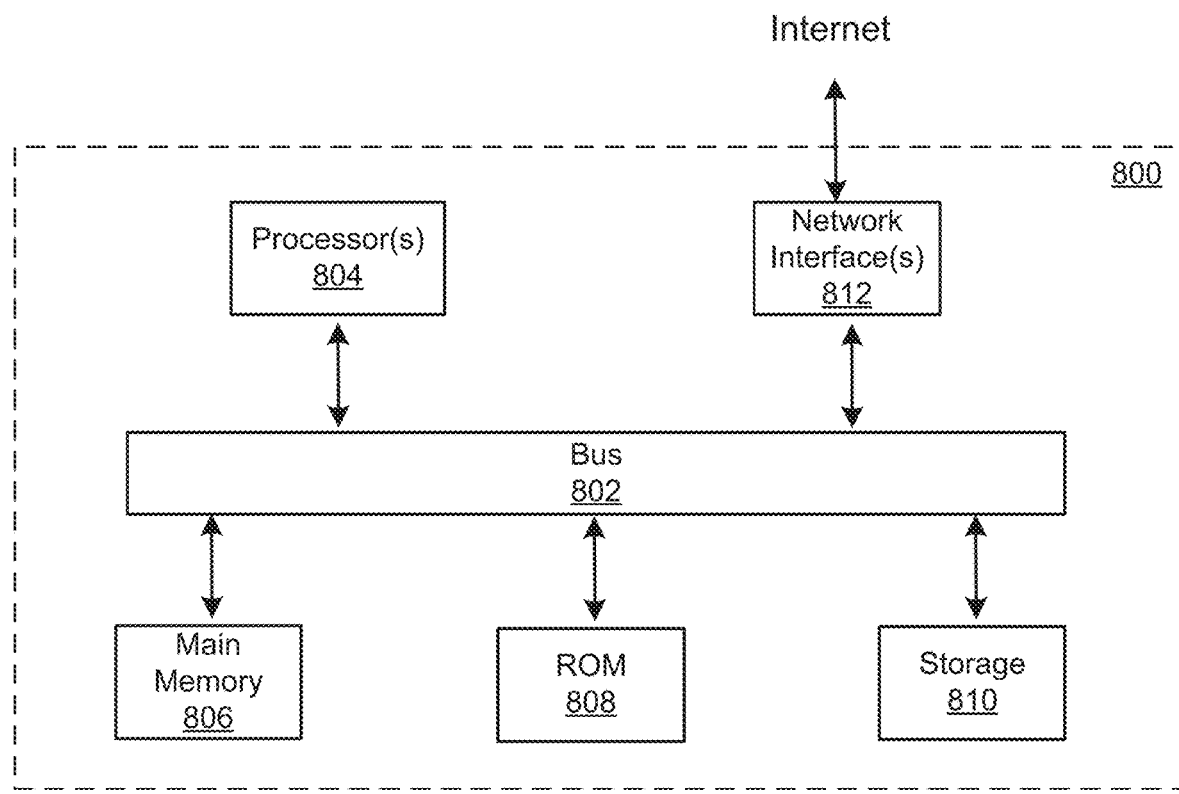
FIG. 8 illustrates a block diagram of an exemplary computer system to implement one or more functionalities of an AI-based image data processing device according to various embodiments.

FIG. 8 illustrates a block diagram of an exemplary computer system 800 to implement one or more of functionalities of the AI-based image sensor according to various embodiments. In some embodiments, the system 800 may correspond to one or more of the first resolution modification unit 204, the feature detection unit 206, the second resolution modification unit 210, the pre-processing unit 212, and the data combination unit 214 illustrated in FIG. 2. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The main memory 806, the ROM 808, and/or the storage 810 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The Detailed Description is not to be taken in a limiting sense, and the scope of various embodiments is defined only by the appended claims, along with the full range of equivalents to which such claims are entitled.

The invention claimed is:

1. An image data processing method comprising:
   receiving, from an image sensor, frame image data of a frame at a first resolution;
   reducing a resolution of the frame image data to a second resolution;
   performing an artificial intelligence (AI) based image recognition on the frame image data at the second resolution to determine one or more regions of interest (ROI) and a priority level of each of the one or more ROIs, wherein the one or more ROIs include a first ROI at a first priority level and a second ROI at a second priority level lower than the first priority level;
   extracting portions of the frame image data corresponding to the one or more ROIs;
   modifying a resolution of the portions of the frame image data corresponding to the one or more ROIs based on the priority level of each of the one or more ROIs;
   maintaining a resolution of a portion of the frame image data corresponding to the first ROI at the first resolution;
   reducing a resolution of a portion of the frame image data corresponding to the second ROI to a third resolution lower than the first resolution and higher than the second resolution; and
   combining the resolution-modified portions of the frame image data corresponding to the one or more ROIs with the frame image data at the second resolution to generate output frame image data.

2. The method of claim 1, further comprising modifying at least one of brightness and contrast of the portions of the frame image data corresponding to the one or more ROIs, wherein the portions of the frame image data corresponding to the one or more ROIs of which at least one of brightness and contrast has been modified are combined with the frame image data at the second resolution to generate the output frame image data.

3. The method of claim 1, wherein the modifying resolution of the portions of the frame image data corresponding to the one or more ROIs comprises:
   reducing a resolution of a portion of the frame image data corresponding to the first ROI to a third resolution lower than the first resolution and higher than the second resolution; and
   reducing a resolution of a portion of the frame image data corresponding to the second ROI to a fourth resolution lower than the third resolution and higher than the second resolution.

4. The method of claim 1, wherein the image sensor is mounted on a vehicle or robot, and the one or more ROIs corresponds to one or more regions including at least one of a human face, a traffic sign, and a license plate.

5. The method of claim 1, wherein the frame image data of the frame is received from the image sensor through a first data communication link of a first bandwidth, and the output frame image data is output through a second data communication link of a second bandwidth lower than the first bandwidth.

6. The method of claim 5, wherein the first data communication link comprises a wired data communication link, including no wireless communication link, and the second data communication link comprises a wireless data communication link.

7. The method of claim 1, further comprising transmitting an image data signal containing the output frame image data, wherein the output frame image data in the image data signal includes a sequence of blocks of row data corresponding to a plurality of rows of the image sensor, and each block of row data includes image data at the second resolution and image data corresponding to the one or more ROIs.

8. The method of claim 1, further comprising transmitting an image data signal containing the output frame image data, wherein the output frame image data in the image data signal includes a first sequence of blocks of row data corresponding to a plurality of rows of the image sensor and a second sequence of blocks of row data corresponding to the plurality of rows; and
   the first sequence of blocks of row data including image data of each of the rows at the second resolution, and the second sequence of blocks of row data including image data of each of the rows corresponding to the one or more ROIs.

9. The method of claim 1, further comprising receiving an external ROI request; and
   extracting one or more portions of the frame image data based on the external ROI request.

10. An image data processing device comprising:
    a first resolution modification circuit configured to receive, from an image sensor, frame image data at a first resolution, and reduce a resolution of the frame image data to a second resolution;
    a feature detection circuit configured to perform an artificial intelligence (AI) based image recognition on the frame image data at the second resolution to determine one or more regions of interest (ROI) and a priority level of each of the one or more ROIs, wherein the one or more ROIs includes a first ROI at a first priority level and a second ROI at a second priority level lower than the first priority level;
    a second resolution modification circuit configured to extract portions of the frame image data corresponding to the one or more ROIs, and modify a resolution of the portions of the frame image data corresponding to the one or more ROIs based on the priority level of each of the one or more ROIs;
    wherein the second resolution modification unit circuit is configured to maintain a resolution of a portion of the frame image data corresponding to the first ROI at the first resolution, and reduce a resolution of a portion of the frame image data corresponding to the second ROI to a third resolution lower than the first resolution and higher than the second resolution; and
    a data combination circuit configured to combine the resolution-modified portions of the frame image data corresponding to the one or more ROIs with the frame image data at the second resolution to generate output frame image data.

11. The image data processing device of claim 10, further comprising a pre-processing circuit configured to modify at least one of brightness and contrast of the portions of the frame image data corresponding to the one or more ROIs, wherein the data combination circuit combines the portions of the frame image data corresponding to the one or more ROIs of which at least one of brightness and contrast has been modified with the frame image data at the second resolution to generate the output frame image data.

12. The image data processing device of claim 10, wherein the second resolution modification circuit is configured to reduce a resolution of a portion of the frame image data corresponding to the first ROI to a third resolution lower than the first resolution and higher than the second resolution, and reduce a resolution of a portion of the frame image data corresponding to the second ROI to a fourth resolution lower than the third resolution and higher than the second resolution.

13. The image data processing device of claim 10, wherein the image data processing device is mountable on a vehicle or robot, and the one or more ROIs corresponds to one or more regions including at least one of a human face, a traffic sign, and a license plate.

14. The image data processing device of claim 10, wherein the first resolution modification circuit receives the frame image data from the image sensor through a first data communication link of a first bandwidth, and the data combination circuit is configured to output the output frame image data through a second data communication link of a second bandwidth lower than the first bandwidth.

15. The image data processing device of claim 14, wherein the first data communication link comprises a wired data communication link, including no wireless communication link, and the second data communication link comprises a wireless data communication link.

16. The image data processing device of claim 10, wherein the data combination circuit is further configured to transmit an image data signal containing the output frame image data, wherein the output frame image data in the image data signal includes a sequence of blocks of row data corresponding to a plurality of rows of the image sensor, and each block of row data includes image data at the second resolution and image data corresponding to the one or more ROIs.

17. The image data processing device of claim 10, wherein the data combination circuit is further configured to transmit an image data signal containing the output frame image data, wherein the output frame image data in the image data signal includes a first sequence of blocks of row data corresponding to a plurality of rows of the image sensor and a second sequence of blocks of row data corresponding to the plurality of rows; and the first sequence of blocks of row data including image data of each of the rows at the second resolution, and the second sequence of blocks of row data including image data of each of the rows corresponding to the one or more ROIs.

18. The image sensor of claim 10, wherein the second resolution modification circuit is configured to receive an external ROI request; and extract one or more portions of the frame image data based on the external ROI request.

* * * * *